United States Patent [19]

Nakamura et al.

[11] Patent Number: 5,114,329
[45] Date of Patent: May 19, 1992

[54] MOLD UNIT FOR INJECTION MOLDING

[75] Inventors: Susumu Nakamura; Koichi Yokoi, both of Yamanashi, Japan

[73] Assignee: Sankyo Engineering Co., Ltd., Yamanashi, Japan

[21] Appl. No.: 665,330

[22] Filed: Mar. 6, 1991

[51] Int. Cl.⁵ .............................................. B29C 45/66
[52] U.S. Cl. .................... 425/190; 425/192 R; 425/589; 425/595
[58] Field of Search .................. 425/188, 190, 192 R, 425/577, 589, 595, 191

[56] References Cited

U.S. PATENT DOCUMENTS 4,976,602 12/1990 Yamazaki .............................. 425/190

Primary Examiner—Tim Heitbrink
Attorney, Agent, or Firm—Colucci & Umans

[57] ABSTRACT

A mold unit for injection molding having an outer frame in two sections is capable of receiving inside molds with flanges. The inside molds with flanges are mounted and removed through the use of pressing mechanisms. The pressing mechanism secures the flanges of an inside mold by the use of a clamp bolt and allows for rotation so that the flange is slidable mounted in a simple manner.

4 Claims, 3 Drawing Sheets

FIG. 1(a)
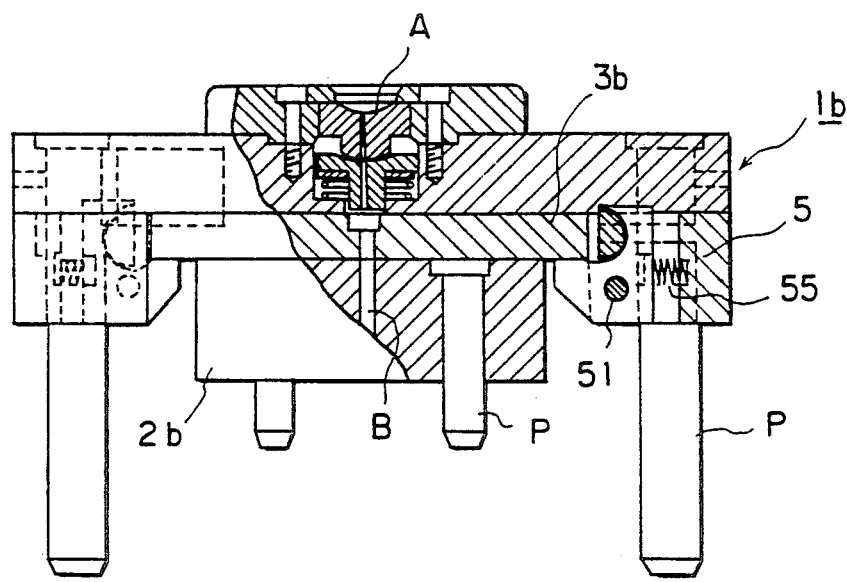
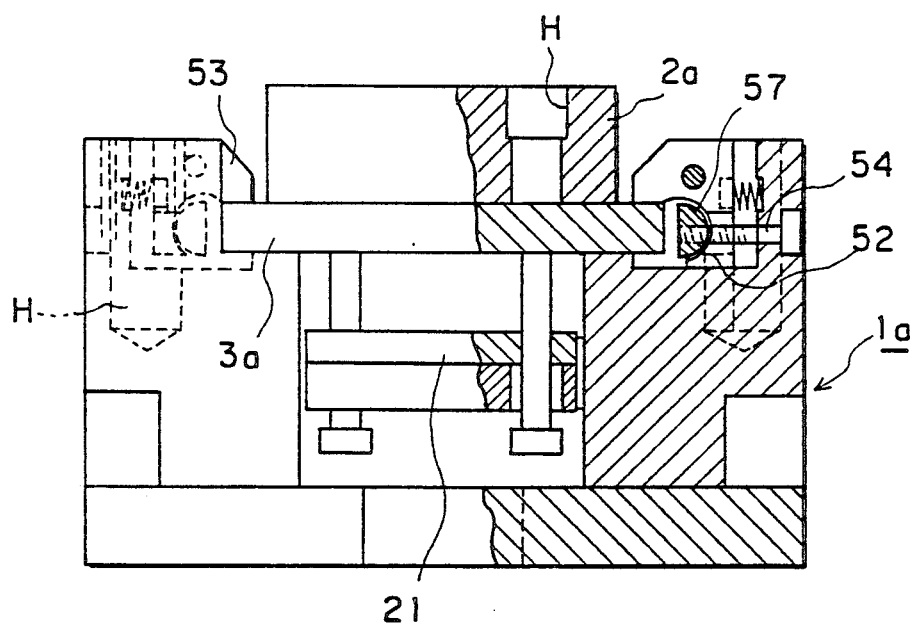
FIG. 1(b)

MOLD UNIT FOR INJECTION MOLDING

BACKGROUND OF THE INVENTION

1. Field of the Invention

The present invention relates to a unit mold for injection molding used to mold synthetic resins or the like in which a pair of mold bodies formed from a core and cavity serve as a cassette type inside mold that may be detachably mounted on an outer frame mounted on an injection molding machine.

2. Description of the Prior Art

In a conventional mold unit, when an inside mold is mounted on an outer frame, first, the inside mold having a core and cavity is inserted into a space of the outer frame in a fitting state, after which they are separated and temporarily secured by pressing members, and the positioning and securing of the inside mold within the outer frame is conducted while the inside mold having a core and cavity is in a closed or joined position.

The conventional unit type mold involves cumbersome steps such as insertion of the inside mold, separation of the core and cavity, and positioning and securing of the inside mold while in a joined configuration. Thus, the inside mold cannot be easily changed. Moreover, since the securing occurs by threadably mounting the pressing member forming a slot on the outer frame, stability is poor and great skill is required.

SUMMARY OF THE INVENTION

An object of the present invention is to provide a mold unit for injection molding in which the positioning of an inside mold is automatically carried out and the inside mold is changed and mounted in a simple manner.

A further object of the present invention is to provide a mold unit for injection molding in which the inside mold can be changed within an extremely short period of time without requiring skills and a single injection molding machine that can be used to perform several kinds of moldings in a short period of time.

For achieving the aforementioned objects, the mold unit according to the present invention provides an arrangement wherein the positioning and securing of an inside mold to an outer frame is accomplished in a one-step manner by utilizing a flange provided on the cassette type inside mold. The flange of the inside mold is inserted into a fitting portion formed by the spacing between the outer frame and a pressing mechanism. The inside mold is secured when the base end of the pressing mechanism is pulled and a pressing end is rotated by a clamp bolt. The turning of the clamp bolt at the outside of the outer frame adjusts the pressing mechanism to the thickness of the flange. The inside mold is secured by the clamp bolt at the same time that both the inside mold and the outer frame are being joined.

Accordingly, in the mold unit for injection molding according to the present invention, the flange of the inside mold is inserted into a gap between a pressing member of a pressing mechanism projected on the inner wall of a fitting portion of the outer frame and an inner wall surface of the fitting portion so that the inside mold can be slidably moved along a predetermined position and received in position without considering other steps such as alignment.

Moreover, the flange provided on the inside mold is secured by using the clamp bolt rotated from the outside of the outer frame, and therefore, the clamping operation can be completed where both the inside mold and the outer frame are exactly joined.

The above and other objects and novel features of this invention will become more apparent by reading the ensuing detailed description in connection with the accompanying drawings. However, the drawings are merely provided for explanation and the scope of the invention is not limited thereby.

BRIEF DESCRIPTION OF THE DRAWINGS

FIGS. 1(a) and 1(b) respectively, disclose partly cutaway side views of an entire mold unit where the inside mold is secured to the outer frame and the mold is opened in two sections according to one embodiment of the present invention;

DETAILED DESCRIPTION OF THE PREFERRED EMBODIMENTS

Figure 2:
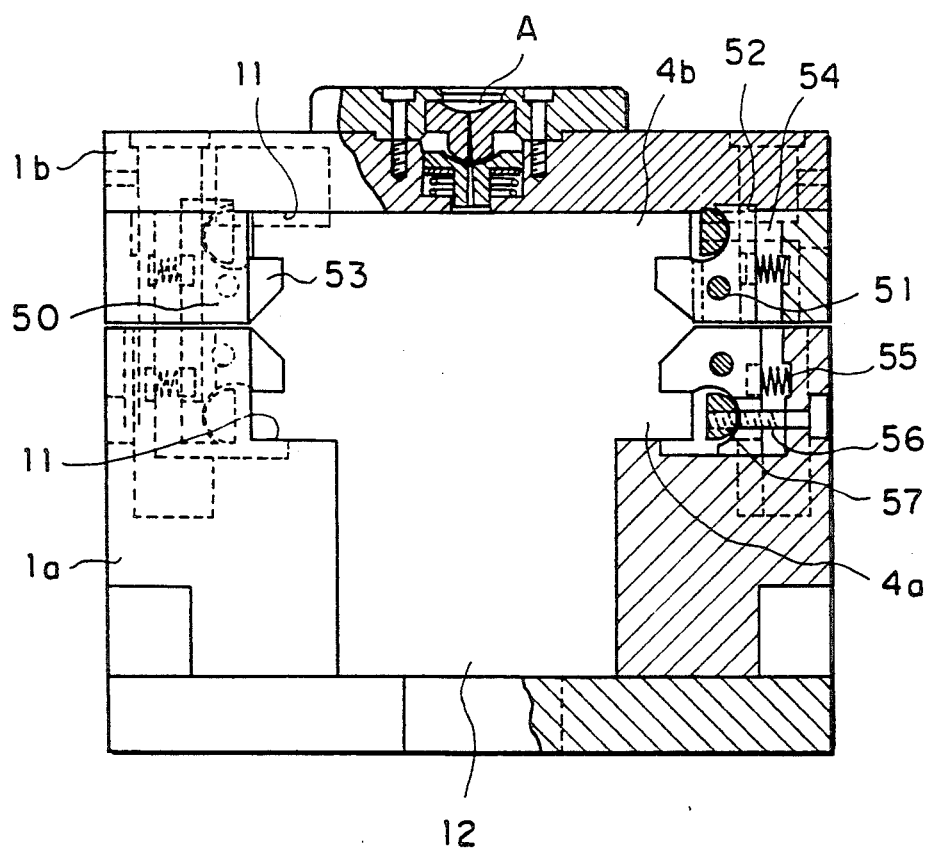
FIG. 2 is a partly cutaway side view of an outer frame with both sections joined without the inside molds inserted.
Figure 3:
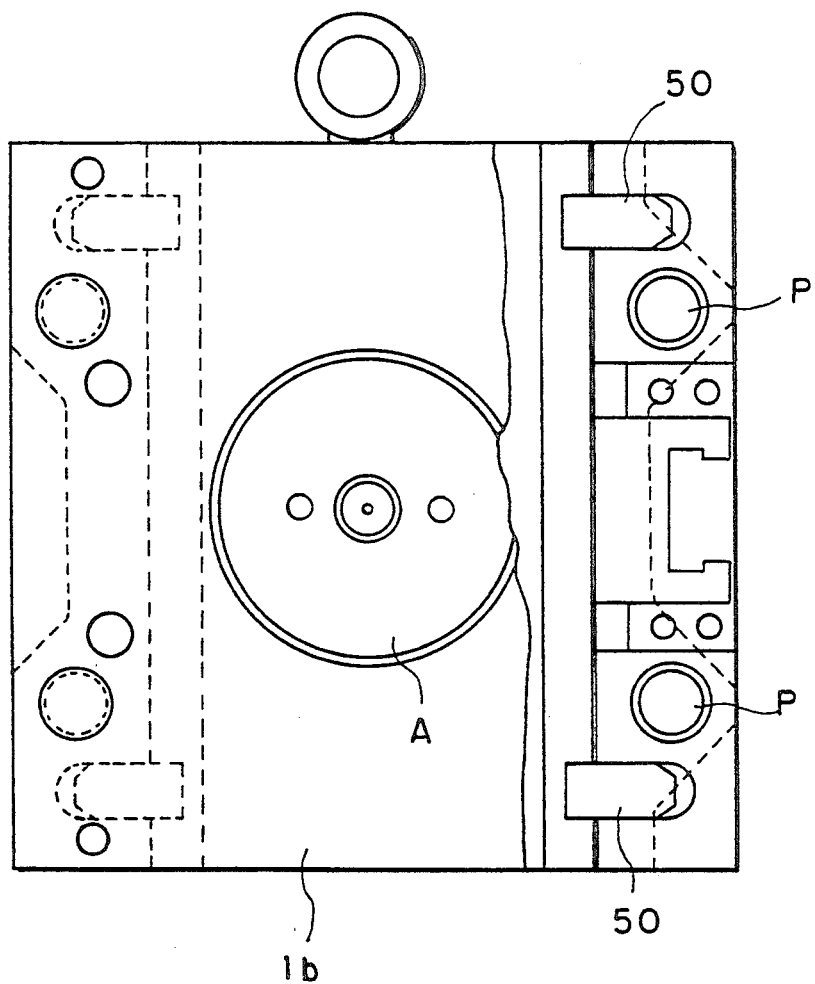
FIG. 3 is a partly cutway side view of an outer frame on the cavity side according to one embodiment of the present invention.

Preferred embodiments of the present invention will now be described in detail with reference to the accompanying drawings.

Referring to the drawings, an outer frame mounted to an injection molding machine comprises a core side frame 1a and a cavity side frame 1b, and is provided with inside mold joining portions 4a and 4b for fitting a core inside mold 2a and a cavity inside mold 2b, respectively. A nozzle touch A is provided at the cavity side frame 1b for receiving molding material from a injection machine, and the material is introduced under pressure therefrom into a mold space (not shown) formed by joining of the core inside 2a and the cavity inside mold 2b via a sprue B in order for molding to occur.

The core-side frame 1a includes a housing portion 12 for housing an ejecting mechanism 21 provided on the inside mold 2a: Both molds are guided by the siding of guide pole P into guide hole H in the frames. The core inside mold 2a and the cavity inside mold 2b are each provided, at outer sides thereof, with flanges 3a and 3b, respectively. First, the molds 2a and 2b are fitted into a fitting portion 4a and 4b of the respective frames 1a and 1b.

The inside mold fitting portions 4a and 4b of the frames 1a and 1b are each provided with a pressing mechanism 5 having a pressing end 53 spaced by a thickness d from an inner wall 11 of the respective frame. The pressing end 53 and the inner wall 11 forms a space for receiving the flange 3a and 3b, which each have the same thickness d.

The pressing mechanism 5 comprises a pressing member 50, which rotates about a pivot 51, a clamp bolt 54 for pulling a base end 52 thereof outwardly, and a spring 55 which biases the pressing ends 53 apart in a separating direction, so that they are pulled back causing a widening of the inside mold fitting portions 4a and 4b for receipt the flanges 3a and 3b.

The clamp bolt 54 is threadably engaged with a drawing nut 57 through a bore 56 extending through the base end 52 of the pressing member 50 from outer walls of the frames 1a and 1b, whereby when the clamp bolt 54 is turned from outside the frame, the drawing nut 57 is drawn to or away from the base end 52 so that the drawing nut 57 can fix or disengage the respective mold flange. A circular recess in base end 52 mates with the circular contour of nut 57 so that the pressing member 50 can pivot on its pivot 51, against the mated molds.

The unit type mold for injection molding according to the present invention is configured as described above. Therefore, the alignment of the core inside mold 2a with the frame 1a is accomplished by joining the frames 1a and 1b causing the joining of the molds 2a and 2b wherein the flanges 3a and 3b are firmly secured by turning the clamp bolt 54. The position of the core inside mold 2a and the cavity inside mold 2b is predetermined through the joining of the core side frame 1a and the cavity side frame 1b along with the flanges 3a and 3b formed by the inner wall 11 of the inside mold fitting portions 4a and 4b. The pressing ends 53 of the pressing members enables the mold 2a and the mold 2b to be changed in an extremely short period of time without requiring much skill.

Accordingly, a single injection molding machine can be used to mold several kinds of moldings in a short period of time.

What is claimed is:

1. A mold unit for injection molding, and for receiving a core inside mold which is mated to and joined with a cavity inside mold, each mold having an outer flange with the outer flanges of the molds being spaced away from each other and each flange having a selected thickness, the mold unit comprising:

a pair of mold frames, each having an inner wall against which a respective one of the mold flanges is engageable;

a pair of spaced apart pressing members pivotally connected to each respective frame, each pressing member having a pressing end movable toward the inner wall with pivoting of the pressing member, into a clamping position for clamping a mold flange between the pressing end of the pressing member and the inner wall, each pressing end being movable away from the inner wall with pivoting of the pressing member into a releasing position for accepting and releasing a mold flange;

biasing means connected to each pressing member for urging each pressing end toward the release position;

each pressing member having a base end adjacent said inner wall of a respective frame; and a clamp bolt for each pressing member, extending into each respective frame and into engagement with a respective base end, for rotation to pull a respective base end away from a respective inner wall to pivot said pressing members to move said pressing ends into their clamping positions so that both molds are simultaneously fixed to said frames, in alignment of said molds with each other, so that said frames can be moved toward and away from each other while maintaining alignment between said molds.

2. A mold unit according to claim 1, wherein said biasing means comprises a spring connected between each pressing member and its respective frame for pivoting each pressing member in a direction that tends to move said base ends toward each other on the frame, and said pressing ends away from each other on the frame.

3. A mold unit according to claim 2, wherein each pressing end has a surface spaced away from the inner wall of each respective frame, by the same thickness as the thickness of the mold flange.

4. A mold unit according to claim 3, wherein each base end has a circular recess therein adjacent the inner wall of the frame, the mold unit including a nut having a circular shape for engaging the circular recess of said base end, said nut being threaded to said clamp bolt for each pressing member whereby rotation of each clamp bolt allows smooth pivoting of each pressing member to move said pressing ends into their clamping positions.

* * * * *